United States Patent
Pitzalis et al.

[15] 3,674,732
[45] July 4, 1972

[54] ROSIN MODIFIED PHENOLIC RESINS AND METHOD OF PREPARING SAME

[72] Inventors: Mario Pitzalis, Arcore; Silvio Vargiu; Ugo Nistri, both of Milan, all of Italy

[73] Assignee: Societa' Italiana Resine S.p.A., Milan, Italy

[22] Filed: Dec. 10, 1969

[21] Appl. No.: 884,005

[30] Foreign Application Priority Data

Dec. 31, 1968 Italy .................................... 25743 A/68

[52] U.S. Cl. ............................................................. 260/25
[51] Int. Cl. ............................................................. C08g 5/22
[58] Field of Search ........................................ 260/25; 106/30

[56] References Cited

UNITED STATES PATENTS

| | | | |
|---|---|---|---|
| 2,007,983 | 7/1935 | Rosenblum | 260/25 |
| 2,101,944 | 12/1937 | Honel | 260/25 |
| 2,750,296 | 6/1956 | Curado | 106/30 |

OTHER PUBLICATIONS

Hackh's Chemical Dictionary, 1944, page 743

*Primary Examiner*—Donald E. Czaja
*Assistant Examiner*—William E. Parker
*Attorney*—Sughrue, Rothwell, Mion, Zinn & Macpeak

[57] ABSTRACT

A method of preparing phenolic resins suitable for the production of inks, characterized in that p-cumyl phenol, formaldehyde, a polyhydroxy alcohol and rosin are polymerized at a temperature of from 130° C. to 270° C. in the presence of a catalyst selected from salts of zinc, calcium, magnesium or manganese with organic or inorganic acids having a dissociation constant (or initial dissociation constant) of less than $1.8 \times 10^{-5}$, the molar ratio of p-cumyl phenol to formaldehyde being between 1:2.5 and 1:4 and the quantity of rosin from 150 to 200 parts by weight per 100 parts by weight of the phenol.

5 Claims, No Drawings

ROSIN MODIFIED PHENOLIC RESINS AND METHOD OF PREPARING SAME

The present invention relates to a particular class of phenolic resins suitable for ink making and to the method of producing such resins.

It is part of standard practice to use inert resins in conjunction with low-viscosity oil driers in the production of printing inks.

Phenolic resins, phenolic resins modified with rosin, maleic resins modified with rosin or metallic calcium or zinc resinates are employed for this purpose.

The resins required for ink making, particularly in the case of large runs printed by photogravure or offset, should have characteristics which ensure rapid release of the solvent.

For this purpose, various compositions are used, such as, for example, those which comprise the condensation products of p-ter-butyl phenol and formaldehyde.

Such resins are not entirely satisfactory, however, when used for the said purposes, especially as regards the brilliance and drying properties of the inks; moreover, they have the disadvantage of the high cost of the phenolic ingredient, that is to say of the p-ter-butyl phenol.

Certain resin compositions have now been discovered which make it possible to reduce or eliminate the drawbacks inherent in the present state of the art when they are used in the production of printing inks particularly suited to the photogravure or offset printing of large runs.

One object of the present invention is thus the provision of resin compositions for printing inks having good brilliance and drying properties in addition to required solvent release.

The invention also has as its object a method for the preparation of the said resin compositions. Further objects of the invention will become apparent from the following description thereof.

The resin compositions here proposed consist essentially of the substances obtained by the poly-condensation of p-cumyl phenol and formaldehyde in the presence of rosin (colophony). More particularly, p-cumyl phenol, formaldehyde and rosin, with or without a polyol, are caused to react at temperatures rising from about 130°C. to a maximum of 260°C. or 270°C. in the presence of certain catalysts, the reaction time being such that the product of reaction lies within a viscosity range to be specified later. Moreover, the quantities of the reagents are regulated so as to ensure that the reaction products have an acidity value between 25 and 70.

In particular, the molar ratio between the p-cumyl phenol and the formaldehyde is maintained at from 1:1.25 to 1:4, while the amount of rosin may vary from 150 to 200 parts by weight per 100 parts by weight of phenolic compound.

The rosins used in the method here proposed may be of various types, such as those derived from tall oil, wood or the like, while the formaldehyde source used may be a low polymer thereof, such as, for instance, paraformaldehyde.

The resin compositions here proposed should preferably contain polyhydroxyl compounds (polyols) such as glycerine, sorbitol and pentaerythritol, which are introduced into the reaction chamber in quantities of 10 to 25 parts by weight per 100 parts by weight of phenolic compound.

The catalysts used for poly-condensation are the salts of zinc, calcium, magnesium or manganese with organic or inorganic acids having a dissociation constant — or, in the case of polybasic acids, an initial dissociation constant — of less than $1.8 \times 10^{-5}$. The acetates and carbonates of calcium and zinc are particularly useful for the purpose. The catalysts are used in quantities of from 0.5 percent to 5.0 percent by weight with respect to the rosin.

Finally, the poly-condensation reaction is carried out in the temperature conditions already specified until the product obtained preferably has a viscosity in the region of H-J on the Gardner scale, the viscosity being determined at a temperature of 25°C. in a toluene solution (1 part by weight of toluol to 1 part by weight of the poly-condensation reaction product).

The use of p-cumyl phenol in the conditions prescribed makes it possible to obtain resin compositions suitable for the production of printing inks having extremely good brilliance and drying properties.

These inks, moreover, give a rapid release of the solvent, as will be shown by the experimental examples given below. Finally, the use of p-cumyl phenol is financially advantageous because of its low cost, since it is a by-product in the process of synthesizing cumene from phenol by way of cumene hydroperoxide.

The p-cumyl phenol can also be obtained simply and economically from phenol and alpha-methylstyrene.

The method followed in the experimental examples for preparing the poly-condensation product is as follows.

A flask is charged with part of the rosin. Then the paraformaldehyde, polyol and p-cumyl phenol are put in, followed finally by the remainder of the rosin.

The whole is melted at 110°C. to 120°C. and zinc carbonate is added to it while stirring. The mixture is maintained at 130°C. for 20 minutes and then raised to 190°C. – 210°C. This temperature is maintained for 2 hours and is then raised to 260°C. It is held at that level until the Gardner viscosity in 50 percent toluol at 25°C. is H-J.

The condensation product is tested for the following: pH value, fusion range, Gardner viscosity and the hardness of a 100-micron film after 30' with the Albert-Koening pendulum.

This last test, which is carried out on the 50 percent toluol solution, indicates the speed of release of the solvent.

EXAMPLE 1

The flask was charged with 680 parts by weight of rosin, 424 of p-cumyl phenol, 66 of glycerine, 222 of paraformaldehyde (95 percent strength) and 6.8 of zinc carbonate.

The product obtained by the procedure already described had the following characteristics: pH value 36, fusion range 150°C. to 156°C., Gardner viscosity at 25°C. (1:1 toluol by weight) J and film hardness 96''.

EXAMPLE 2

The flask was charged with 680 parts by weight of rosin, 424 of p-cumyl phenol, 46.5 of glycerine, 46.5 of sorbitol, 222 of paraformaldehyde (95 percent strength) and 6.8 of zinc carbonate.

The product obtained by the procedure already described had the following characteristics: pH value 33, fusion range 146°C. to 153°C., Gardner viscosity at 25°C. (1:1 toluol by weight) J and film hardness 64''.

EXAMPLE 3

The flask was charged with 680 parts by weight of rosin, 424 of p-cumyl phenol, 46.5 of glycerine, 46.5 of sorbitol, 222 of paraformaldehyde (95 percent strength) and 12.0 of zinc carbonate.

The product obtained by the procedure already described had the following characteristics: pH value 36, fusion range 146°C. to 153°C., Gardner viscosity at 25°C. (1:1 toluol by weight) J and film hardness 119''.

EXAMPLE 4

The flask was charged with 680 parts by weight of rosin, 424 of p-cumyl phenol, 73 pentaerythritol and 12 of zinc carbonate.

The product obtained by the procedure already described had the following characteristics: pH value 36, fusion range 150°C. to 155°C., Gardner viscosity at 25°C. (1:1 toluol by weight) J and film hardness 110''.

We claim:

1. A method of preparing phenolic resins having an acidity value of from 25 to 70 and a Gardner viscosity of about H-J in a 50 percent by weight toluol solution at 25°C suitable for the production of inks which comprises polymerizing a reaction system consisting essentially of p-cumyl phenol, formaldehyde, rosin and a poly hydroxy alcohol at a temperature of from 130°C. to 270°C. in the presence of a catalyst selected from the group consisting of zinc acetate, zinc carbonate, calcium acetate and calcium carbonate, the molar ratio of p-cumyl phenol to formaldehyde being between 1:2.5 and 1:4, the quantity of rosin being from 150 to 200 parts by weight per 100 parts by weight of the phenol, the quantity of polyhydroxy alcohol being from 10 to 25 parts by weight per 100 parts by weight of the phenol, and the quantity of catalyst being from 0.5 to 5.0 percent by weight based on the rosin.

2. A method as in claim 1 wherein the polyhydroxy alcohol is selected from the group consisting of glycerine, sorbitol and pentaerythritol.

3. Phenolic resin prepared by the process of claim 1.

4. The process of claim 1 wherein said formaldehyde is paraformaldehyde.

5. The process of claim 1 wherein said rosin is derived from a member selected from the group consisting of tall oil and wood.

* * * * *